Nov. 16, 1926.
J. G. ROBINSON
GRIPPING PAD
Filed May 21, 1926
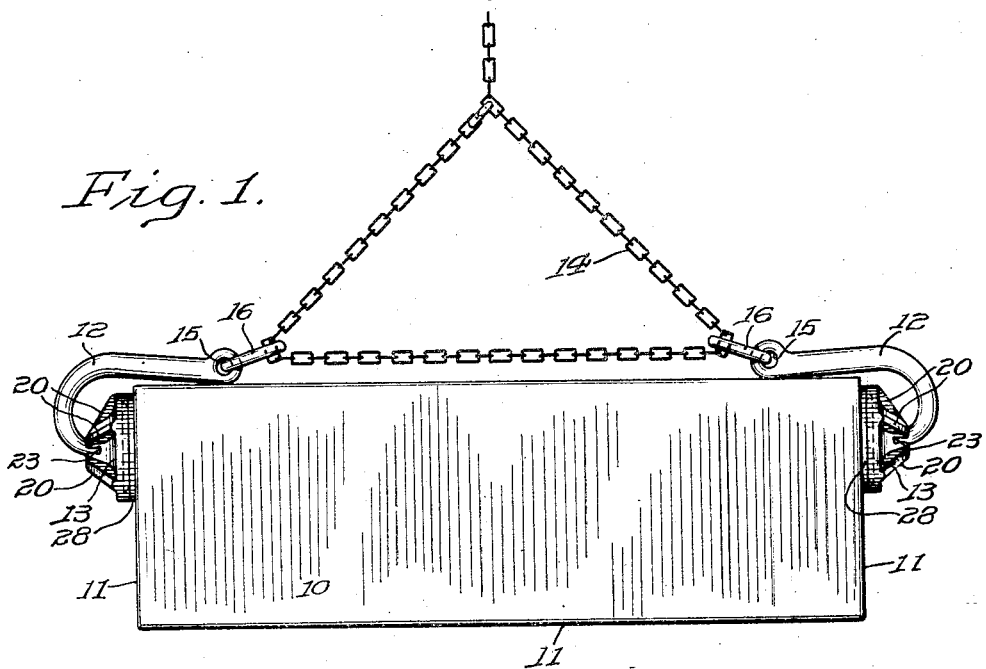
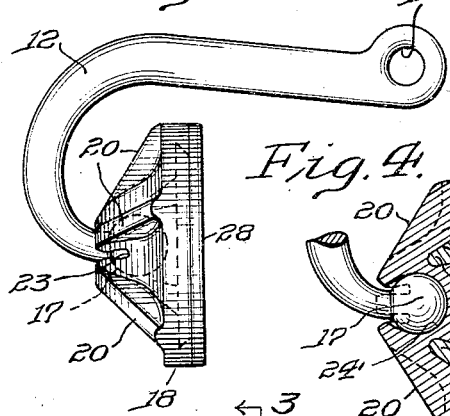
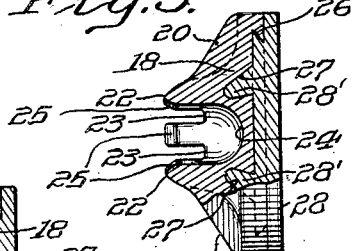
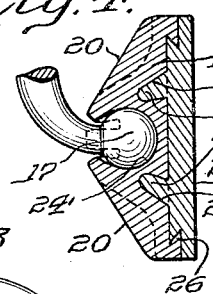
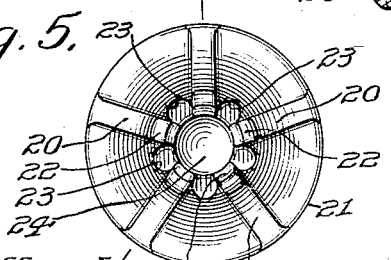
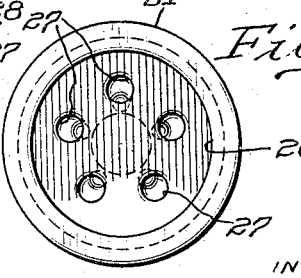
INVENTOR.
John Gorgas Robinson.
BY Frank H. Borden
ATTORNEY Patented Nov. 16, 1926.

1,606,898

UNITED STATES PATENT OFFICE.

JOHN GORGAS ROBINSON, OF GERMANTOWN, PENNSYLVANIA.

GRIPPING PAD.

Application filed May 21, 1926. Serial No. 110,737.

This invention relates to gripping pads for grapples and hoists, pertaining particularly to the engaging members of grapples for moving and lifting stones.

It is expensive to drill or cut holes in stone for the attachment of lifting devices, as is the current practice, and the use of such holes for the insertion of the gripping or engaging elements increases the handlings to which the stone are subjected before they are properly placed in the work. It has been found that such drilling of holes and insertion of gripping points may be eliminated by the use on the face of the gripping members of soft metal pads which firmly engage the stone without scratching or slipping. However, as heretofore constructed the pads have been insecurely connected so that the flow of the soft metal was unstopped and the harder backing surface contacted with the faces of the stone with disastrous results. Furthermore the connection of the pad with the grapple or hook devices was unsatisfactory.

Some of the objects of this invention are: to provide an improved swivel or universal connection between the gripping pad and the hook of the grapple; to provide a pad having a gripping face adequate for firm and unslipping engagement with the work and which is securely anchored against slipping or the flow of the metal under sliding pressure; to provide an improved method of refacing pads after a maximum of wear has been delivered therefrom; to provide a gripping pad of high efficiency; and many other objects and advantages as will be apparent as the description proceeds.

In the accompanying drawings, Fig. 1, represents a side elevation of an assembled grappling unit utilizing the pads of the invention to support a finished cut stone, Fig. 2, represents a side elevation of a hook and the associated pad of the invention, Fig. 3, represents a vertical section through the improved pad showing the anchoring devices of the face and the socket portion of the universal connection with its rib fingers, Fig. 4, represents a section through the assembled pad showing the finger ends of the ribs bent over about the ball of the hook shown in full lines, Fig. 5, represents an elevation of the ball-engaging end of the gripping member, and Fig. 6 is an elevation of the pad face before the metal pad is applied showing the openings in which the integral teeth of the pad engage.

Referring now to the drawings, the cut stone 10, shown as rectangular with faces 11, but obviously susceptible to many changes in shape according to the material and required sizes, is engaged on opposed faces 11 by the opposed lifting hooks 12, through the gripping pads 13. The ends of hooks 12 are engaged by a conventional chain or cable 14 as will be readily understood.

As shown in Fig. 2, the hook 12, which may well be a drop forging, has an eye 15 to receive the ring 16, and at the other curved end terminates in a ball 17. The ball 17 forms the ball portion of a ball and socket joint or universal connection, cooperating the rear face of the pad 18. The pad is provided with external ribs 20, extending from adjacent the axis and radially to the outer periphery 21 of the pad. At their converging end the ribs terminate in fingers 22, spaced by the recesses 23, and arranged to be bent inward slightly to embrace a portion of the ball 17, but allowing freedom of movement thereto. To this end the fingers, normally extending axially about the concavity 24, have bevelled faces 25, so that the ball 17 may enter the concavity, after which the fingers may be bent over to enclose the ball.

The ribs reinforce the pad, and the fingers in which they terminate, and also provide strengthening members for the structure below the ribs, into which the locking holes for the pad face are preferably formed.

At the front or engaging end of the pad, a peripheral overhanging shoulder 26 is formed, and in a circle concentric with the axis, preferably, a series of inwardly extending internally tapered openings 27 are provided, which incline toward the axis as shown. These openings are preferably arranged below the ribs so the strengthening of the material about the openings is had.

The friction pad 28, which may be of any relatively soft metal, such as lead, solder, Babbitt metal, etc., is preferably applied in a molten state, so that it fills the openings 27, then the space between the edges of the overhanging shoulder extending under the shoulder, and forms a pad of appreciable thickness in alinement with the outer periphery 21 of the pad 13. When properly positioned it is impossible for the metal of the main portion of the pad to contact with the face of the stone, and flowing, or undue wear of the gripping or friction face is precluded both by the shoulder 26 and the openings 27, into which latter the metal extends to form integral locking teeth 28'. It will be seen that the friction on the pad face having a tendency to push the soft metal laterally of the pad will be resisted by the locking shoulder, and also by the teeth 28 on the opposite side of the pad, usually the bottom if the lift is vertical. As the teeth are inclined inward toward the axis a firm locking is secured to maintain the initial position of the friction element regardless of the direction of pull on the pad. In other words as the ball and socket connection provides universal movement the position of the pad relative the hook may vary with each stone lifted, and in any case there is one or more integral teeth resisting the drag on the friction face.

It becomes necessary from time to time to reface the pads the length of their use depending upon the care with which the faces of the stone are brushed or cleaned before the lifting is undertaken, and it is then a simple matter to chisel out the metal down to the shoulder 26, after which the teeth 28 may be shaken out of the openings 27 due to the tapered walls thereof. Of course the soft metal may be melted and poured out and replaced as desired, as the hard metal of the main portion of the pad will sustain high heat without injury, sufficient at least to melt the friction face.

I claim as my invention:

1. The combination with a pad having an axial peripheral shoulder and a plurality of internally extending and axially inclined openings, a friction facing of soft metal covering the face of the pad, and having locking engagement with the shoulder and with said openings.

2. A gripping pad for hoists, having a recessed face formed by a peripheral overhanging shoulder, and a plurality of tapered inwardly extending axially inclined openings arranged equidistant from the axis and arranged to receive and form a locking engagement with the metal of a friction facing.

3. A pad for grapples comprising body having an axial recess to receive a ball, a plurality of ribs on a face of the body, each rib terminating in a finger arranged for bending toward such ball to retain such ball in the recess.

4. A pad for grapples comprising a body having an axial recess at one side, and a plurality of inwardly extending openings in the other, a plurality of ribs on the body to reinforce the body above the openings, each rib terminating in a bendable finger.

In testimony whereof I affix my signature.

JOHN GORGAS ROBINSON.